United States Patent [19]
Kaneko et al.

[11] Patent Number: 5,568,319
[45] Date of Patent: Oct. 22, 1996

[54] ASPHERICAL EYEPIECE

[75] Inventors: Masanobu Kaneko, Yokohama; Yasunori Ueno, Kawasaki, both of Japan

[73] Assignee: Nikon Corporation, Tokyo, Japan

[21] Appl. No.: 441,061

[22] Filed: May 15, 1995

Related U.S. Application Data

[63] Continuation of Ser. No. 5,119, Jan. 15, 1993, abandoned.

[30] Foreign Application Priority Data

Jan. 31, 1992 [JP] Japan .................................. 4-045981

[51] Int. Cl.$^6$ .................................................. G02B 25/00
[52] U.S. Cl. ........................................ 359/643; 359/645
[58] Field of Search .................................. 359/643, 644, 359/645, 646, 647

[56] References Cited

U.S. PATENT DOCUMENTS

| | | | |
|---|---|---|---|
| 2,234,716 | 3/1941 | Wood | 359/646 |
| 3,158,677 | 11/1964 | Lacomme et al. | 359/646 |
| 3,788,732 | 1/1974 | Shoemaker | 359/644 |
| 3,975,088 | 8/1976 | Shoemaker | 359/645 |
| 4,650,293 | 3/1987 | Kimura et al. | 359/708 |
| 5,162,945 | 11/1992 | Matsuo et al. | 359/716 |

FOREIGN PATENT DOCUMENTS 0108516  4/1989  Japan ....................... 359/645

OTHER PUBLICATIONS

Richard A. Buchroeder, "Distortionless Eyepiece", Applied Optics, vol. 27, No. 16, pp. 3327–3328.
B. L. Nefedov, "Eyepieces With an Imaginary Front Focal Plane and a Negative Collection Lens", Sov. J. Opt. Technol. 46(7), Jul. 1979, pp. 422–430.

*Primary Examiner*—Edward K. Look
*Assistant Examiner*—Christopher Verdier
*Attorney, Agent, or Firm*—Shapiro and Shapiro

[57] ABSTRACT

An aspherical eyepiece has a positive lens group and a correction plate positioned on the light incident side of the positive lens group and having an aspherical surface. The correction plate is positioned between the positive lens group and the front side focal plane of the positive lens group or in front of the front side focal plane of the positive lens group. Thus, although the eyepiece is constructed by a reduced number of optical members including an aspherical optical member, distortion can be favorably corrected even with a wide field angle.

8 Claims, 7 Drawing Sheets

OBJECTIVE LENS FORMING REAL IMAGE

OBJECTIVE LENS FORMING REAL IMAGE

ASTIGMATISM

DISTORTION

OBJECTIVE LENS FORMING REAL IMAGE

ASTIGMATISM

DISTORTION

FIG. 5A
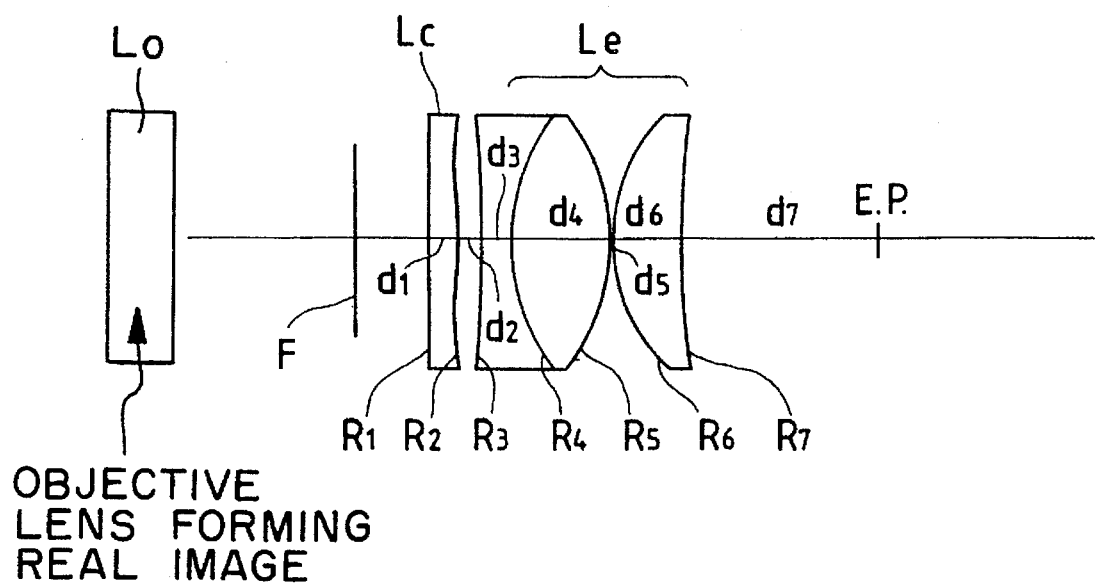
OBJECTIVE LENS FORMING REAL IMAGE
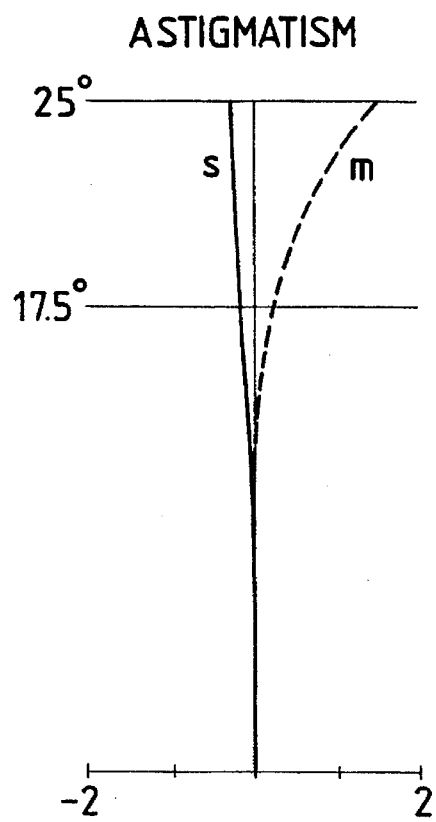
FIG. 5B
ASTIGMATISM
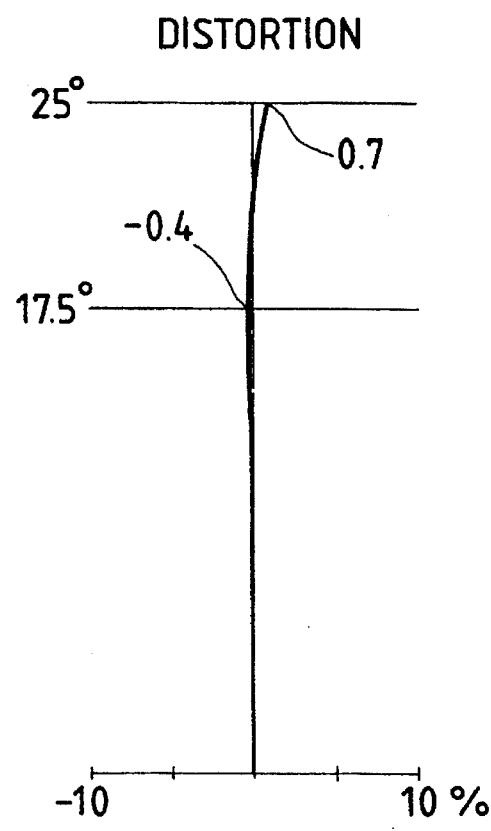
FIG. 5C
DISTORTION

FIG. 6
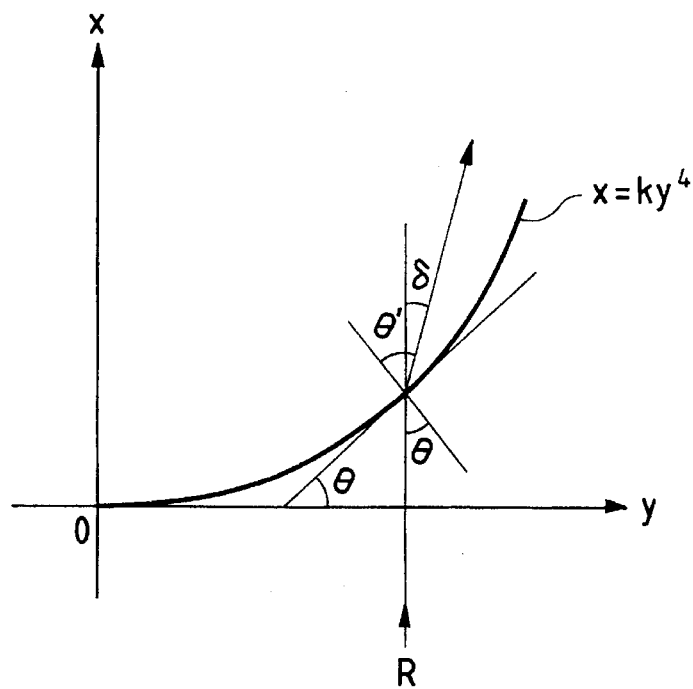
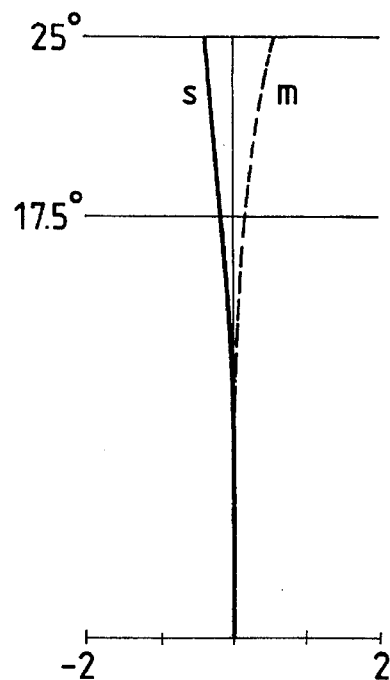
FIG. 8A
PRIOR ART
ASTIGMATISM
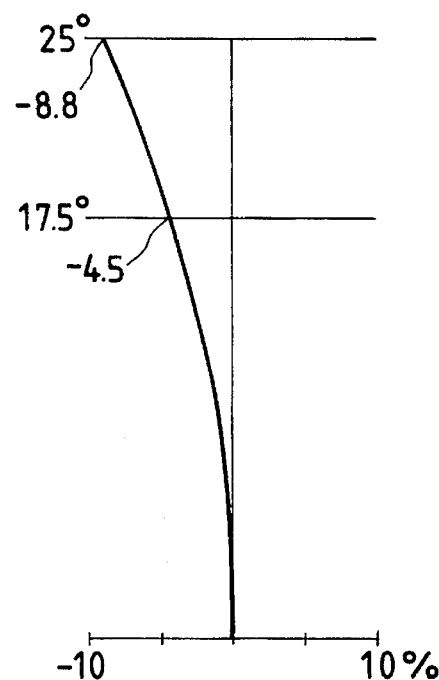
FIG. 8B
PRIOR ART
DISTORTION

1
ASPHERICAL EYEPIECE

This is a continuation of application Ser. No. 08/005,119 filed Jan. 15, 1993, now abandoned.

BACKGROUND OF THE INVENTION

1. Field of the invention

This invention relates to an eyepiece having an aspherical optical member for use in, for example, a telescope such as a binocular, a microscope or the like.

2. Related Background Art

An eyepiece is used, for example, in a telescope such as a binocular, a microscope or the like for enlarging a real image formed by an objective lens for observation. In recent years, an aspherical lens has been introduced in order to reduce the number of lenses constituting an optical system. There have already been proposed eyepieces which employ an aspherical lens in part of constituent lenses. An eyepiece thus having an aspherical lens or an aspherical member therein is hereinafter referred to as an aspherical eyepiece.

Any of conventionally proposed aspherical eyepieces makes part of a spherical lens aspherical to correct pupil aberration mainly caused by the eyepiece. This pupil aberration appears as distortion when a person looks into the eyepiece.

In the prior art, however, since part of a lens constituting an eyepiece is made aspherical, aberration inherent to the eyepiece and the pupil aberration must be corrected simultaneously. To make a sufficient correction for them, there arises a problem that the number of lenses must be considerably increased or the field angle of the eyepiece must be restricted to be narrower. For this reason, even if an aspherical lens is used, for example, in a wide angle eyepiece whose field angle is approximately 50° for use in binoculars, distortion cannot be reduced with a structure having a small number of lenses.

SUMMARY OF THE INVENTION

In view of the above problem, it is an object of the present invention to provide an eyepiece which is capable of satisfactory correcting distortion and providing a wide field angle even with a small number of optical members including an aspherical optical member.

A first aspherical eyepiece according to the present invention comprises a positive lens group Le and a correction plate Lc having an aspherical shape which is disposed on the light incident side, for example, as shown in FIG. 1A.

A second aspherical eyepiece according to the present invention is based on the first aspherical eyepiece and has the correction plate Lc disposed between the positive lens group Le and the front side focal plane F of the positive lens group Le.

A third aspherical eyepiece according to the present invention is based on the second aspherical eyepiece and has an aspherically shaped correction plate Lc, where the aspherical surface shape is given by the following equation (1):

$$X = \frac{Cy^2}{1 + (1 - \kappa C^2 y^2)^{1/2}} + \sum_{i=2}^{\infty} C_{2i} y^{2i} \quad (1)$$

where y represents the height from the optical axis; x the distance from a plane tangent to the peak of the aspherical surface to a point at the height y of the aspherical surface; c the curvature at the peak of the aspherical surface; $\kappa$ a conical constant; and $C_{2i}$ (i is an integer not less than 2) an aspherical surface coefficient.

An aspherical surface coefficient $C_4$ must satisfy the following condition:

$$1 \times 10^{-5} < |C_4| < 1 \times 10^{-3}$$

Further, the shape of the correction plate Lc is such that the thickness thereof is increased toward the edge thereof, as shown, for example, in FIG. 1A or 5A.

A fourth aspherical eyepiece according to the present invention is based on the first aspherical eyepiece and has the correction plate Lc' which is disposed in front of the front side focal plane F of the positive lens group Le.

A fifth aspherical eyepiece according to the present invention, based on the fourth aspherical eyepiece, has an aspherical shape of a correction plate given by the above equation (1), where y represents the height from the optical axis; x the distance from a plane tangent to the peak of the aspherical surface to a point at the height y of the aspherical surface; c a curvature at the peak of the aspherical surface; $\kappa$ a conical constant; $C_{2i}$ (i is an integer not less than 2) an aspherical surface coefficient, where an aspherical surface coefficient $C_4$ is assumed to satisfy the following condition:

$$1 \times 10^{-5} < |C_4| < 1 \times 10^{-3}$$

In addition, the correction plate Lc is shaped such that the thickness thereof is decreased toward the edge.

In the first aspherical eyepiece according to the present invention, the principle of the so-called Schmitt camera is applied to the eyepiece, where an eyepiece is constituted of a positive lens group and a correction plate having an aspherical surface. The positive lens group Le (Le') in this embodiment can also function individually as an eyepiece. The present invention can therefore be considered to be an eyepiece constituted of a positive lens group whose distortion is corrected by a correction plate Lc (Lc') having an aspherical surface. It should be noted that the correction plate may be considered as an aspherical lens which makes part of the eyepiece. Also, as shown in the second and fourth eyepieces, the correction plate may be disposed at a position in front of or behind the front side focal plane F of the positive lens group.

In the third and fifth aspherical eyepieces, the aspherical surface is defined by an equation. The base of this equation will be explained below with reference to FIGS. 6 and 7A and 7B.

Assume that the shape of the correction plate is given by the following equation (2) with k being a constant, as shown in FIG. 6:

$$x = ky^4 \quad (2)$$

The angle $\theta$ of tangent is derived by differentiating the equation (2). Considering a region of third-order aberration, the angle $\theta$ is given by:

$$\theta_3 = 4ky^3$$

Assuming also that the refractive index of the correction plate is represented by n, the angle of a light beam R after passing through the aspherical surface by $\theta'$, and the angle of deflection of the light beam by the aspherical surface by $\delta$, $\delta$ is given by the following equation (3):

$$\delta = \theta' - \theta = (n-1)\theta = 4(n-1)ky^3 \quad (3)$$

Pupil aberration $\Delta S'$ of pupil due to the eyepiece in turn is given by the following equation (4) with A being a constant in a region of third-order aberration:

$$\Delta S'=Ay^2 \tag{4}$$

where y represents the height of a light beam incident to the eyepiece.

Assuming now that a scaling ratio of the imagery on the pupil of the eyepiece is represented by β, the following equation stands:

$$\Delta S'=\beta^2 \Delta S \tag{5}$$

Then, further assuming that the distance S up to the incident pupil is sufficiently large in comparison with the focal length of the eyepiece, the relationship between ΔS and δ are expressed by the following equation:

$$\Delta S=S^2 \cdot \delta/y=4(n-1)kS^2y^2 \tag{6}$$

Substituting the equation (6) for the equation (5), the following equation is derived:

$$\Delta S'=4(n=1)\beta^2 kS^2 y^2 \tag{7}$$

By comparing the equation (7) with the equation (4), it is understood that both equations are coincident if the following equation stands:

$$A=4(n=1)\beta^2 kS^2 \tag{8}$$

Therefore, if k in the equation (2) is given so as to cancel the pupil aberration represented by the equation (4), it is possible to provide an eyepiece free from distortion as a whole.

Also, by transforming the equation (2), the following equation is derived:

$$x=ky^4=\{A/4(n-1)\beta^2 S^2\}y^4 \tag{9}$$

Since β=S'/S, the equation (9) is further transformed as follows:

$$x=A/\{4(n-1)S'^2\}y^4 \tag{10}$$

The foregoing coefficient k is the same as the aspherical coefficient $C_4$ in the equation (1) which is an ordinary equation representing an aspherical surface when i=2 ($y^4$).

Also, in the equation (10), since S' represents the eye relief of the eyepiece, it may be thought to range approximately between 10 and 30.

The coefficient A in the equation (4) varies depending upon the structure of an eyepiece, the position of an incident pupil, a focal length, and so on. However, if the value of the aspherical coefficient $C_4$ is set to satisfy $1\times 10^{-5}<|C_4|<1\times 10^{-3}$, pupil aberration (i.e., distortion) can be favorably corrected for the coefficient A of an ordinary eyepiece. Nevertheless, if $|C_4|$ is below the lower limit, the resultant correction for the pupil aberration (distortion) will be short. Conversely, if it exceeds the upper limit, the correction will be excessive.

FIGS. 7A and 7B illustrate how a light beam passes through the optical system of the present invention. In FIG. 7A, a light beam R incident to an eyepiece Le becomes a light beam $R_1$ after passing through the eyepiece Le and passes a point $P_1$ on the optical axis when a correction plate Lc is not provided.

Supposing that the eyepiece Le does not present pupil aberration, the light beam R, after passing through the eyepiece Le, becomes a light beam $R_2$ as indicated by a broken line, and passes a point $P_2$ on the optical axis.

Generally, due to the influence of pupil aberration of the eyepiece, the point $P_1$ is closer to the eyepiece than the point $P_2$. Therefore, angles $\theta_1$ and $\theta_2$ formed by the light beams $R_1$ and $R_2$ with the optical axis have the relationship expressed by $\theta_1>\theta_2$, whereby this pupil aberration appears as positive distortion (in a spool shape) when looking into the eyepiece. It can be thought, from a different viewpoint, that this aberration is corrected by the foregoing correction plate because the incident light beam R is corrected by the correction plate Lc, wherein it appears as if the light beam R exits from an image height h' so as to cancel the distortion.

Therefore, when the correction plate Lc is positioned between the eyepiece Lc and its front side focal plane F, distortion is corrected if the correction plate Lc is shaped such that the inclination δ of the light beam R is directed upward, that is, the thickness of the correction plate Lc is increased toward the edge thereof.

If pupil aberration is corrected, the eye relief becomes longer by a portion of the pupil aberration. Further in this case, since the light beam R directing to the eyepiece Le is incident to a position higher by Δh than a case when the correction plate Lc is not employed, the light beam $R_3$ exiting from the eyepiece Le crosses the optical axis at a point $P_3$ which is further away by a value Δl corresponding to Δh on the optical axis from the point $P_2$ at which the light beam $R_2$ crosses the optical axis when pupil aberration is absent.

Therefore, if this correction plate Lc is applied to an eyepiece with a short eye relief, an eyepiece can be provided which has an eye relief longer by a portion obtained by the correction for pupil aberration plus the additional Δl portion.

Further, as shown in FIG. 7B, when a correction plate Lc' is positioned in front of the front side focal plane F of an eyepiece Le', the correction plate Lc' may be shaped such that the inclination δ of a light beam is directed downwardly, i.e., the thickness of the correction plate is decreased toward the edge thereof, in order that the light beam passes at the height h" on the focal plane so as to cancel distortion. However, contrary to the above described case, the light beam is incident to the eyepiece Le' at a height position lower by Δh' whereby the eye relief becomes shorter correspondingly thereto by Δl'.

It will be appreciated that this correction plate Lc' may be applied to an eyepiece with a too long eye relief, resulting in the eyepiece which is free from distortion and has an appropriately corrected length of the eye relief, as a second embodiment later described.

Next, explanation will be given of the correspondence of the present invention to respective embodiments, later described.

To begin with, first and second embodiments show a correction plate Lc (Lc') whose aspherical shape is represented only by a term of $y^4$ in the foregoing equation (1). In a third embodiment, the aspherical shape of a correction plate Lc is represented by the term of $y^4$ and an additional higher-order term. Specifically, pupil aberration can be perfectly corrected by the term of $y^4$ in a region of third-order aberration, as described above. However, as the field angle of the eyepiece is extended, pupil aberration deviates from the region of the third-order aberration, whereby the pupil aberration cannot be perfectly corrected only by the above-mentioned correction plate with the spherical surface which is represented only by the term of $y^4$. For this reason, a higher-order correction term may be added to the equation representing the aspherical shape of the correction plate Lc. However, the correction is principally based on the term of $y^4$, and achieved on the assumption that the value of the aspherical coefficient $C_4$ is within the above-mentioned range.

A fourth embodiment employs a positive lens group Le of a type different from that of the third embodiment. It goes without saying that freedom in design is further extended if the surface opposite to the aspherical surface of a correction plate Lc is curved.

A fifth embodiment shows an example where the curvature c of the peak of the aspherical surface (central curvature) of a correction plate Lc is not zero, i.e., a coefficient of a $y^2$ term is not zero. For explaining this in detail, the aspherical shape is assumed to be represented by the following equation:

$$x=my^2+ky^4 \qquad (11)$$

Treating in a manner similar to the above, the angle θ of tangent, the angle of deflection δ, the distance to an incident pupil S and aberration of pupil ΔS' are respectively given by the following equations:

$$\theta \approx 2my+4ky^3 \qquad (12)$$

$$\delta=(n-1)\theta=(n-1)(2my+4ky^3) \qquad (13)$$

$$\Delta S=S^2 \cdot \delta/y=(n-1)(2my+4ky^3)S^2 \qquad (14)$$

Thus, the following equation is derived:

$$\Delta S'=4(n-1)\beta^2 k S^2 y^2+2(n-1)\beta^2 m S^2 \qquad (15)$$

The first term in the equation (15) is the same as that when the central curvature c is not zero. The second term is a constant term which does not include a $y^2$ term and represents a shift of an image point due to a surface having the central curvature c, so that it is not related to the correction of pupil aberration.

Therefore, even when a second-order curved surface corresponding to the $y^2$ term is related to the shape of the correction plate as shown in the fifth embodiment, since correction of pupil aberration is influenced only by the $y^4$ term, the pupil aberration is favorably corrected by restricting the value of the aspherical coefficient $C_4$ in the $y^4$ term, as the aspherical eyepieces of the third or fifth embodiments of the present invention.

As described above, the present invention provides eyepieces with an appropriate eye relief which do not exhibit distortion over a wide field angle by correcting pupil aberration of a positive lens group by a correction plate.

BRIEF DESCRIPTION OF THE DRAWINGS

FIG. 5A illustrates the lens structure of an eyepiece according to a fifth embodiment together with an objective lens shown diagrammatically;

FIGS. 5B and 5C are graphs showing astigmatism and distortion of the fifth embodiment;

FIGS. 6, 7A and 7B are diagrams used for explaining the principle of the present invention; and FIGS. 8A and 8B are graphs showing astigmatism and distortion presented by a conventional eyepiece having the same structure as that of a positive lens group of the fist embodiment of the present invention.

DESCRIPTION OF THE PREFERRED EMBODIMENTS

Several numerical embodiments of the present invention will hereinafter be described with reference to the accompanying drawings. In the following numerical embodiments, each of surfaces of lenses is designated a surface number i (i=1, 2, 3 . . . ) in the ascending order sequentially from the surface adjacent to an objective lens, and parameters representing the optical system are defined as follows:

$f_e$: the focal length of the whole system of an eyepiece itself;

$R_i$: the radius of curvature of the $i^{th}$ surface (the radius of curvature of aspherical peak in aspherical lens);

$d_i$: the spacing on the optical axis between the $i^{th}$ surface and the $(i+1)^{th}$ surface;

$n_i$: the refractive index of a medium between the $i^{th}$ surface and the $(i+1)^{th}$ surface on a d-line (note that the refractive index $n_i$ of air is blank); and $\nu_{di}$: the Abbe number of the medium between the $i^{th}$ surface and the $(i+1)^{th}$ surface (note that the Abbe number $\nu_{di}$ of air is blank).

Also, in the following embodiments, the aspherical surface shape is expressed by the following function:

$$x=cy^2/\{1+(1-\kappa c^2 y^2)^{1/2}\}+C_4 y^4+C_6 y^6+C_8 y^8+C_{10} y^{10}$$

where parameters are defined as follows:

y: the height from the optical axis;

x: the distance from a plane tangent to the peak of a spherical surface to a point at the height y on the spherical surface;

c: the curvature of the peak of the spherical surface;

κ: a conical constant; and $C_4$–$C_{10}$: aspherical coefficients.

[First Embodiment]

Figure 1A:
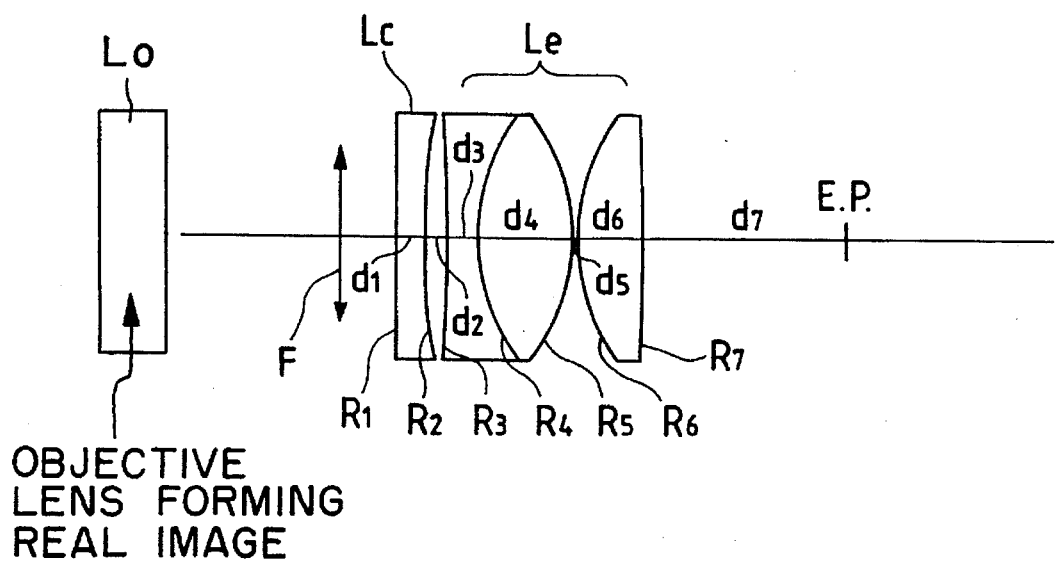
FIG. 1A illustrates the lens structure of an eyepiece according to a first embodiment of the present invention together with an objective lens shown diagrammatically.
Figure 1B:
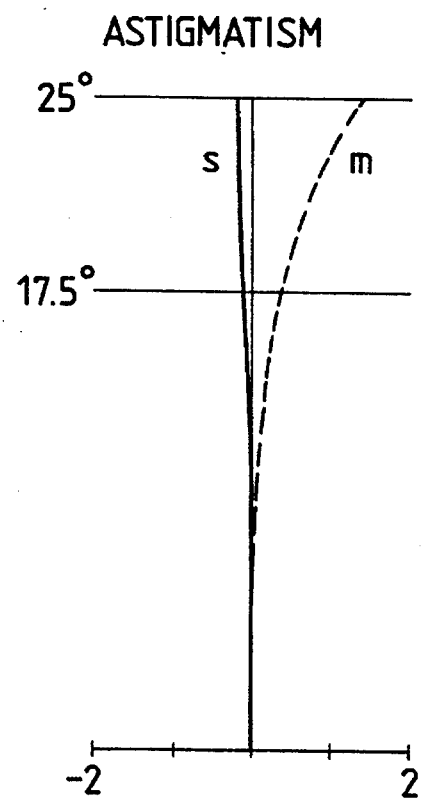
FIGS. 1B and 1C are graphs showing astigmatism and distortion of the first embodiment.
Figure 1C:
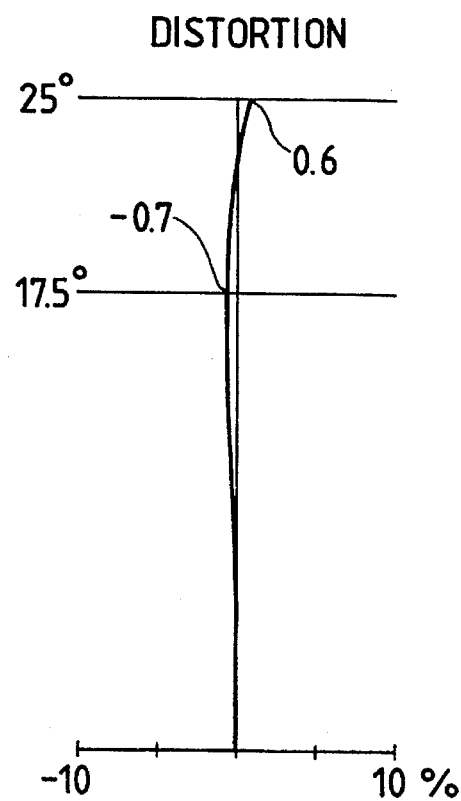

FIG. 1A illustrates the structure of lenses according to a first embodiment, and FIGS. 1B and 1C astigmatism and distortion presented by the first embodiment. Referring to FIG. 1A, E.P. designates an eye point and Lo designates an objective lens forming a real image. A correction plate Lc and a positive lens group Le comprised of spherical lenses are disposed in this order from the objective lens in the direction of the eye point E.P. The positive lens group consists of a lens assembly comprising a biconvex lens and a biconcave lens, and a biconvex lens in this order from the side of the correction plate Lc. The correction plate Lc is disposed between the front side focal plane F (on the side of the objective lens) of the positive lens group Le and the positive lens group Le, and the surface of the correction plate Lc on the side of the eye point E.P. is made aspherical.

Numerical examples of the parameters representing the structure of the optical system of the first embodiment and the aspherical shape of the correction plate Lc will be shown in the following Table 1.

TABLE 1

$f_c = 12.0$

| i | $R_i$ | $d_i$ | $v_{di}$ | $n_i$ |
|---|-------|-------|----------|-------|
| 1 | 0.0 | 1.5 | 57.6 | 1.49108 |
| 2 | 0.0 | 1.5 | | |
| 3 | −140.0 | 2.0 | 25.3 | 1.80518 |
| 4 | 13.0 | 6.0 | 61.1 | 1.58913 |
| 5 | −13.0 | 0.2 | | |
| 6 | 12.2 | 4.0 | 60.1 | 1.62041 |
| 7 | −480.9 | 13.1 | | |

$\kappa = 0$, $C_4 = 2.15 \times 10^{-4}$, $C_6 = C_8 = C_{10} = 0$

[Second Embodiment]

Figure 2A:
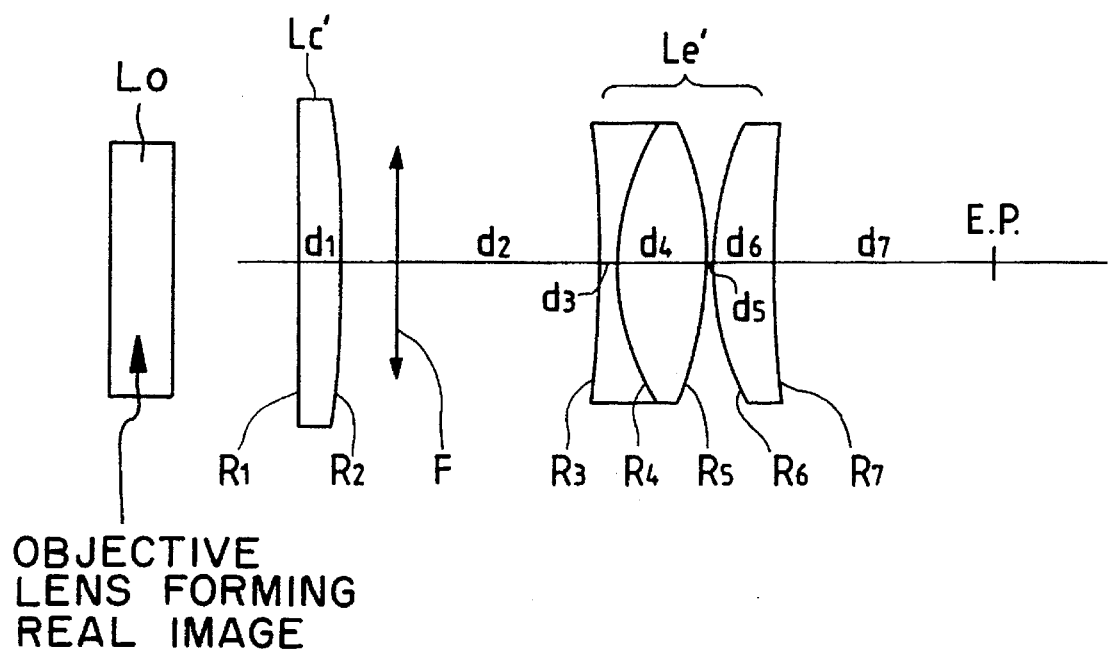
FIG. 2A illustrates the lens structure of an eyepiece according to a second embodiment together with an objective lens shown diagrammatically.
Figure 2B:
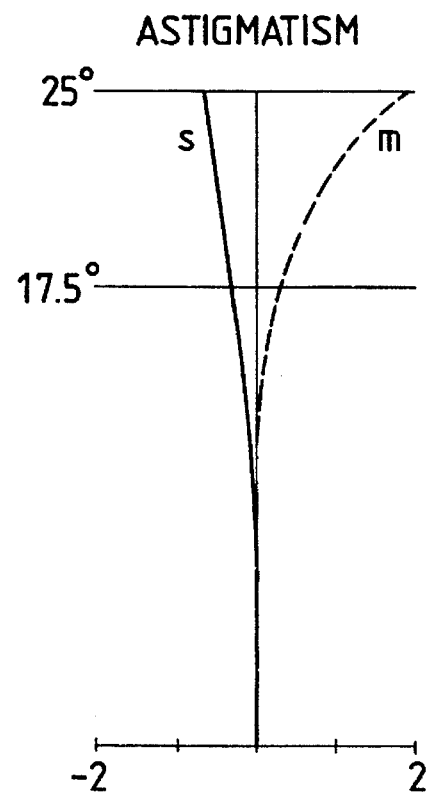
FIGS. 2B and 2C are graphs showing astigmatism and distortion of the second embodiment.
Figure 2C:
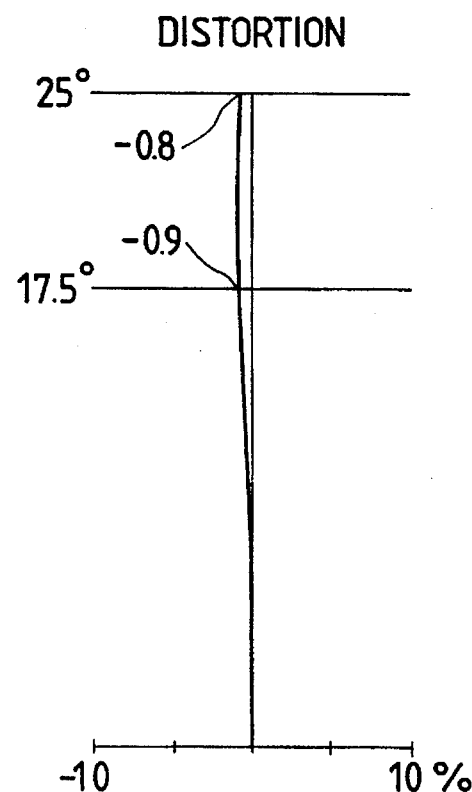

FIG. 2A illustrates the structure of lenses according to a second embodiment, and FIGS. 2B and 2C astigmatism and distortion presented by the second embodiment. Referring to FIG. 2A, a correction plate Lc' and a positive lens group Le' comprised of spherical lenses are disposed in this order from an objective lens Lo in the direction of the eye point E.P. The positive lens group Le' consists of a lens assembly comprising a biconvex lens and a biconcave lens, and a positive meniscus lens having a convex surface directed toward the objective lens in this order from the side of the correction plate Lc'. The correction plate Lc' is disposed on the front side of the front side focal plane F (on the side of the objective lens) of the positive lens group Le', and the surface of the correction plate Lc' on the side of the eye point E.P. is made aspherical. Numerical examples of the parameters representing the structure of the optical system of the first embodiment and the aspherical shape of the correction plate Lc' will be shown in the following Table 2.

TABLE 2

$f_c = 18.0$

| i | $R_i$ | $d_i$ | $v_{di}$ | $n_i$ |
|---|-------|-------|----------|-------|
| 1 | 0.0 | 2.5 | 57.6 | 1.49108 |
| 2 | 0.0 | 16.4 | | |
| 3 | −80.0 | 1.0 | | |
| 4 | 15.0 | 6.0 | 28.6 | 1.79504 |
| 5 | −20.0 | 0.2 | 53.1 | 1.62230 |
| 6 | 16.5 | 4.0 | | |
| 7 | 193.9 | 14.0 | 53.9 | 1.71300 |

$\kappa = 0$, $C_4 = -1.0 \times 10^{-4}$, $C_6 = C_8 = C_{10} = 0$

[Third Embodiment]

Figure 3A:
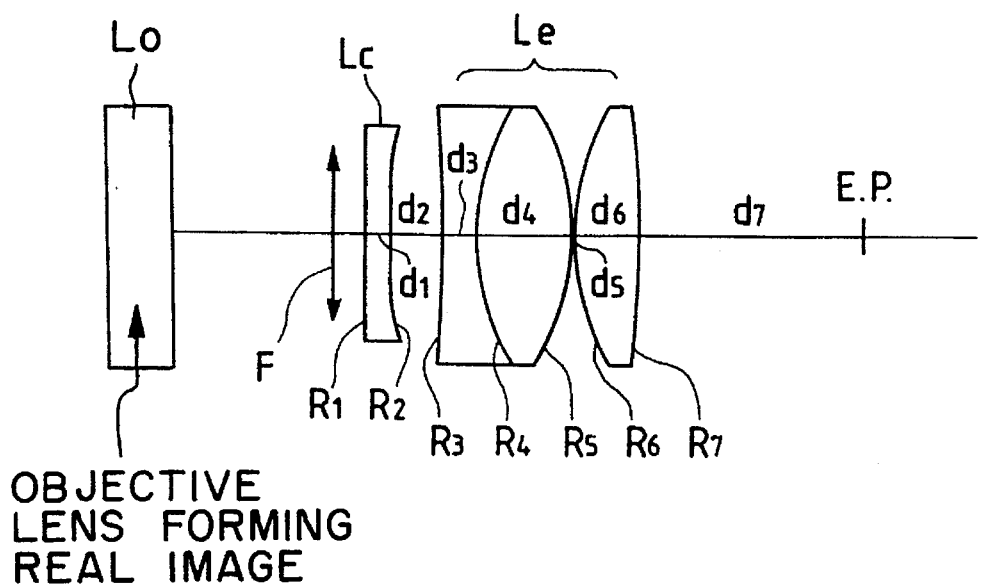
FIG. 3A illustrates the lens structure of an eyepiece according to a third embodiment together with an objective lens shown diagrammatically.
Figure 3B:
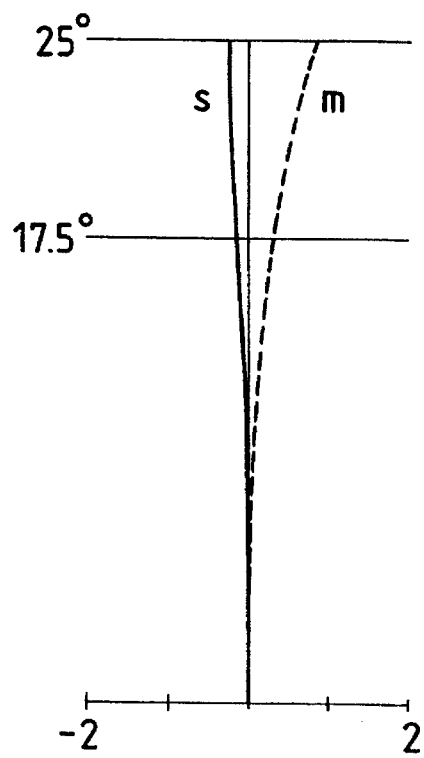
FIGS. 3B and 3C are graphs showing astigmatism and distortion of the third embodiment.
Figure 3C:
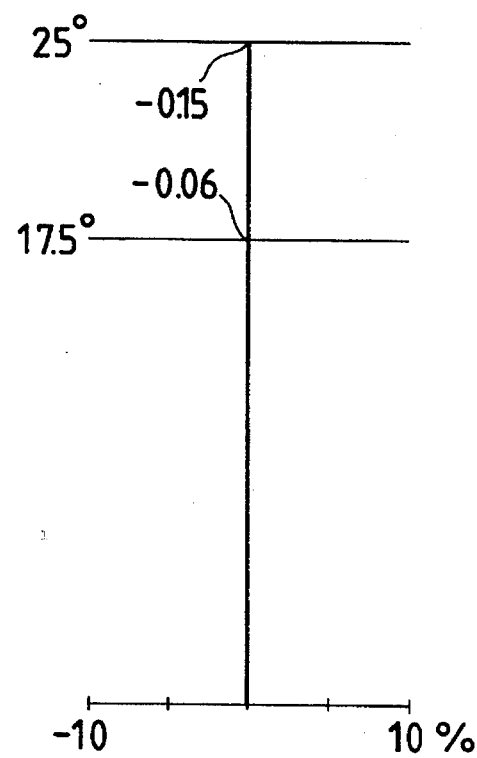

FIG. 3A illustrates the structure of lenses according to a third embodiment, and FIGS. 3B and 3C astigmatism and distortion presented by the third embodiment. Referring to FIG. 3A, a correction plate Lc and a positive lens group Le comprised of spherical lenses are disposed in this order from an objective lens Lo in the direction of the eye point E.P. The positive lens group consists of a lens assembly comprising a concave lens and a biconvex lens, and a biconvex lens in this order from the side of the correction plate Lc. The correction plate Lc is disposed between the front side focal plane F (on the side of the objective lens) of the positive lens group Le and the positive lens group Le, and the surface of the correction plate Lc on the side of the eye point E.P. is made aspherical. Numerical examples of the parameters representing the structure of the optical system and the aspherical shape of the correction plate Lc of the third embodiment will be shown in the following Table 3.

TABLE 3

$f_c = 12.0$

| i | $R_i$ | $d_i$ | $v_{di}$ | $n_i$ |
|---|-------|-------|----------|-------|
| 1 | 0.0 | 1.5 | 57.6 | 1.49108 |
| 2 | 0.0 | 3.2 | | |
| 3 | −120.0 | 2.0 | 25.3 | 1.80518 |
| 4 | 13.8 | 6.0 | 60.1 | 1.62041 |
| 5 | −13.8 | 0.2 | | |
| 6 | 14.7 | 4.0 | 61.1 | 1.58913 |
| 7 | −45.0 | 14.0 | | |

$\kappa = 0$
$C_4 = 6.0325 \times 10^{-4}$
$C_6 = -4.5649 \times 10^{-6}$
$C_8 = -6.5600 \times 10^{-9}$
$C_{10} = -1.4809 \times 10^{-11}$

[Fourth Embodiment]

Figure 4A:
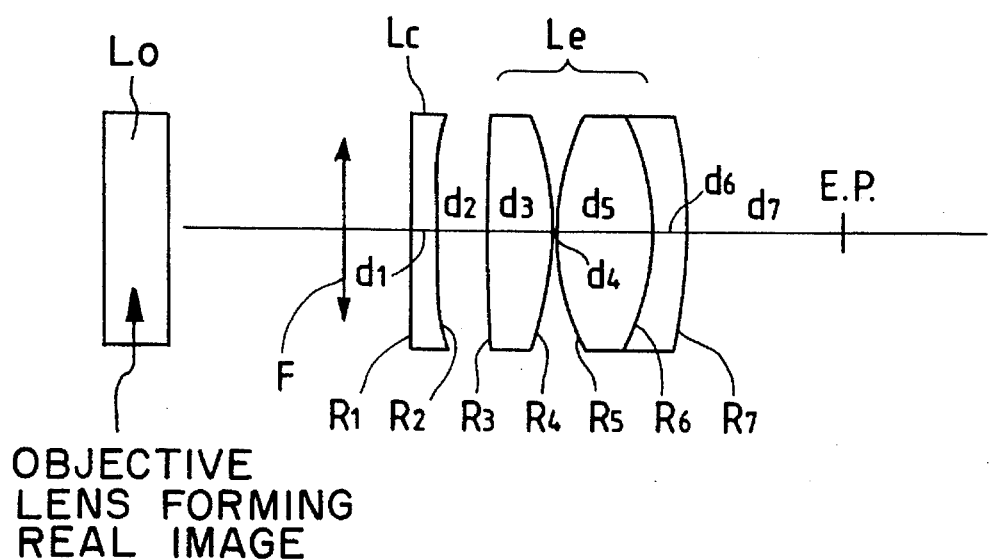
FIG. 4A illustrates the lens structure of an eyepiece according to a fourth embodiment together with an objective lens shown diagrammatically.
Figure 4B:
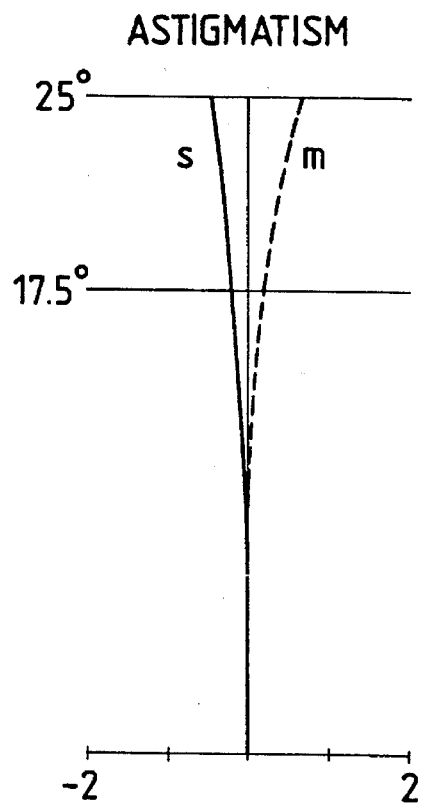
FIGS. 4B and 4C are graphs showing astigmatism and distortion of the fourth embodiment.
Figure 4C:
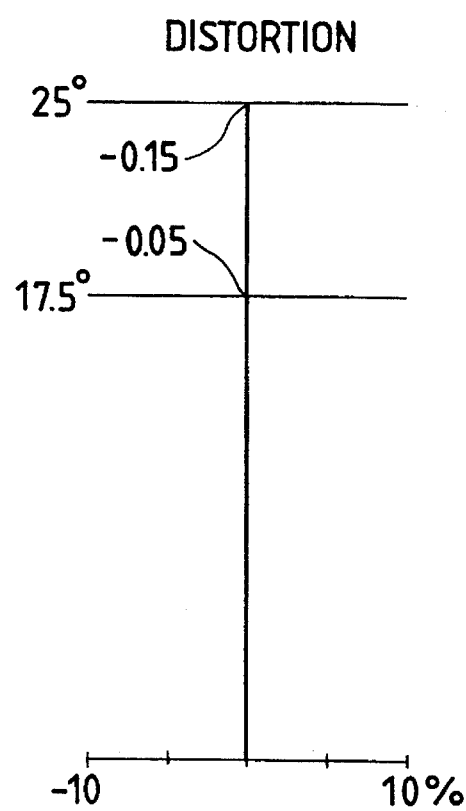
Figure 7A:
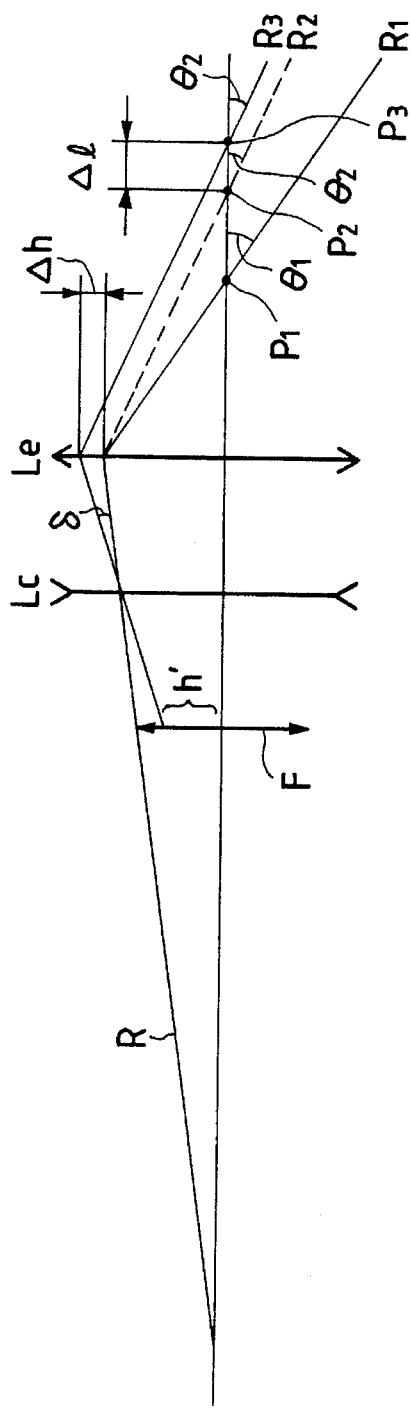
Figure 7B:
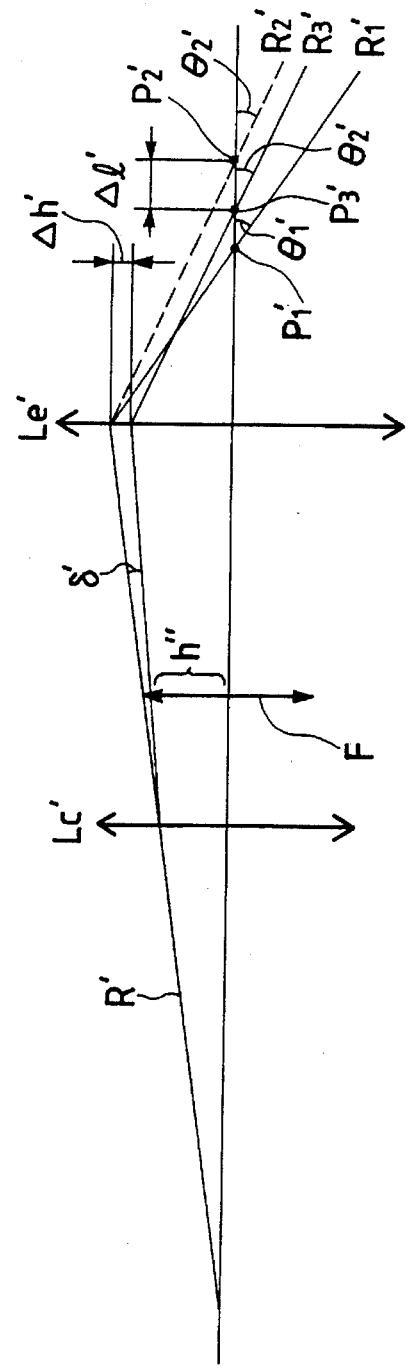

FIG. 4A illustrates the structure of lenses according to a fourth embodiment, and FIGS. 4B and 4C astigmatism and distortion presented by the fourth embodiment. Referring to FIG. 4A, a correction plate Lc and a positive lens group Le comprised of spherical lenses are disposed in this order from an objective lens Lo in the direction of the eye point E.P. The positive lens group consists of a convex lens and a lens assembly comprising a biconvex lens and a negative meniscus lens in this order from the side of the correction plate Lc. The correction plate Lc is disposed between the front side focal plane F (on the side of the objective lens) of the positive lens group Le and the positive lens group Le, and the surface of the correction plate Lc on the side of the eye point E.P. is made aspherical. The values of parameters representing the structure of the optical system and the aspherical shape of the correction plate Lc of the fourth embodiment will be shown in the following Table 4.

TABLE 4

$f_c = 12.0$

| i | $R_i$ | $d_i$ | $v_{di}$ | $n_i$ |
|---|-------|-------|----------|-------|
| 1 | 0.0 | 1.5 | 57.6 | 1.49108 |
| 2 | 0.0 | 3.2 | | |
| 3 | 100.0 | 4.0 | 64.1 | 1.51680 |
| 4 | −17.0 | 0.2 | | |
| 5 | 13.5 | 6.0 | 61.1 | 1.58913 |
| 6 | −13.5 | 2.0 | 25.3 | 1.80518 |
| 7 | −30.0 | 10.1 | | |

$\kappa = 0$,
$C_4 = 2.9903 \times 10^{-4}$
$C_6 = -7.5214 \times 10^{-7}$
$C_8 = 1.6650 \times 10^{-8}$
$C_{10} = 3.4727 \times 10^{-10}$

[Fifth Embodiment]

FIG. 5A illustrates the structure of lenses according to a fifth embodiment, and FIGS. 5B and 5C astigmatism and distortion presented by the fifth embodiment. Referring to FIG. 5A, a correction plate Lc and a positive lens group Le comprised of spherical lenses are disposed in this order from an objective lens Lo in the direction of the eye point E.P. The positive lens group consists of a lens assembly comprising a convex lens and a biconcave lens and a positive meniscus lens having its convex surface directed to the objective lens side in this order from the side of the correction plate Lc. The correction plate Lc is disposed between the front side focal plane F (on the side of the objective lens) of the positive lens group Le and the positive lens group Le, and the surface of the correction plate Lc on the side of the eye point E.P. is made aspherical. The values of parameters representing the structure of the optical system and the aspherical shape of the correction plate Lc of the fifth embodiment will be shown in the following Table 5.

TABLE 5

$f_e = 12.0$

| i | $R_i$ | $d_i$ | $v_{di}$ | $n_i$ |
|---|-------|-------|----------|-------|
| 1 | 0.0 | 1.5 | 57.6 | 1.49108 |
| 2 | −50.0 | 1.5 | | |
| 3 | −140.0 | 2.0 | 25.3 | 1.80518 |
| 4 | 13.0 | 6.0 | 61.1 | 1.58913 |
| 5 | −13.0 | 0.2 | | |
| 6 | 10.8 | 4.0 | 60.1 | 1.62041 |
| 7 | 50.98 | 11.9 | | |

$\kappa = 0$, $C_4 = 2.15 \times 10^{-4}$, $C_6 = C_8 = C_{10} = 0$

As can be understood from FIGS. 1B and 1C showing astigmatism and distortion of the first embodiment and FIGS. 2B and 2C showing astigmatism and distortion of the second embodiment, in the example where the correction plate Lc (Lc') has an aspherical surface represented only by $y^4$, distortion of 1% or less can be achieved over a field angle of 50°.

Also, from FIGS. 3B and 3C showing astigmatism and distortion of the third embodiment and FIGS. 4B and 4C showing astigmatism and distortion of the fourth embodiment, it is understood that distortion is substantially perfectly eliminated when the aspherical shape of the correction plate Lc is represented by the $y^4$ term with an additional higher order term. Further, the third embodiment provides the eye relief being 14.0 which is largely extended, i.e., by a factor of 1.17, as compared with the focal length of the eyepiece which is 12.0.

Incidentally, the positive lens group Le (Le') may be used individually as an eyepiece. For reference, FIGS. 8A and 8B show astigmatism and distortion presented by the positive lens group Le without the correction plate Lc of the first embodiment and a conventional eyepiece having the same structure. As is apparent from FIGS. 8A and 8B, that the eyepiece only comprising spherical lenses exhibits a relatively large distortion of 8.8% with a field angle of 50°.

It goes without saying that the present invention is not limited to the foregoing embodiments but may take various structures without departing from the gist of the present invention. For example, the present invention is applicable to an eyepiece which consists, for example, of two lens groups comprising a positive lens group Le and another positive or negative lens group in front of the front side focal point of a positive lens group Le.

What is claimed is:

1. An aspherical eyepiece for enlarging and observing a real image formed by an objective lens having positive refractive power, said eyepiece having positive refractive power as a whole and including from an eye side toward said objective lens:

a positive lens group; and a correction plate for correcting pupil aberration of the positive lens group, the correction plate being disposed between the positive lens group and a front side focal plane of the positive lens group, and having an aspherically shaped surface.

2. An aspherical eyepiece according to claim 1, wherein said correction plate is shaped such that the thickness thereof is increased toward the edge thereof.

3. An aspherical eyepiece according to claim 2, wherein when the shape of the aspherical surface of said correction plate is given by the following equation:

$$X = \frac{Cy^2}{1 + (1 - \kappa C^2 y^2)^{1/2}} + \sum_{i=2}^{\infty} C_{2i} y^{2i}$$

where y represents the height from the optical axis; x the distance from the plane tangent to the peak of the aspherical surface to a point at the height y on the aspherical surface; C the curvature at the peak of the aspherical surface; $\kappa$ a conical constant; and $C_{2i}$ an aspherical surface coefficient, i being an integer not less than two, an aspherical surface coefficient $C_4$ satisfies $1 \times 10^{-5} < |C_4| < 1 \times 10^{-3}$.

4. An aspherical eyepiece according to claim 1, wherein said positive lens group is constituted of only spherical lenses.

5. An aspherical eyepiece for enlarging and observing a real image formed by an objective lens having positive refractive power, said eyepiece having positive refractive power as a whole and including from an eye side toward said objective lens:

a positive lens group; and a correction plate for correcting pupil aberration of the positive lens group, the correction plate being disposed between said objective lens and a front side focal plane of said positive lens group, and having an aspherically shaped surface.

6. An aspherical eyepiece according to claim 5, wherein said correction plate is shaped such that the thickness thereof is decreased toward the edge thereof.

7. An aspherical eyepiece according to claim 6, wherein when the shape of the aspherical surface of said correction plate is given by the following equation:

$$X = \frac{Cy^2}{1 + (1 - \kappa C^2 y^2)^{1/2}} + \sum_{i=2}^{\infty} C_{2i} y^{2i}$$

where y represents the height from the optical axis; X the distance from the plane tangent to the peak of the aspherical surface to a point at the height y on the aspherical surface; C the curvature at the peak of the aspherical surface; $\kappa$ a conical constant; and $C_{2i}$ an aspherical surface coefficient, i being an integer not less than two, an aspherical surface coefficient $C_4$ satisfies $1 \times 10^{-5} < |C_4| < 1 \times 10^{-3}$.

8. An aspherical eyepiece according to claim 5, wherein said positive lens group is constituted of only spherical lenses.

* * * * *